United States Patent [19]

Weissenberger et al.

[11] Patent Number: 4,669,594
[45] Date of Patent: Jun. 2, 1987

[54] CLUTCH DISC FOR A MOTOR VEHICLE FRICTION DISC CLUTCH

[75] Inventors: Helmuth Weissenberger, Waigolshausen; Johann Hayen, Osnabrück, both of Fed. Rep. of Germany

[73] Assignee: Fichtel & Sachs AG

[21] Appl. No.: 695,588

[22] Filed: Jan. 28, 1985

[30] Foreign Application Priority Data

Jan. 28, 1984 [DE] Fed. Rep. of Germany ....... 3403023

[51] Int. Cl.⁴ .............................................. F16D 3/66
[52] U.S. Cl. .................................... 192/106.2; 464/68
[58] Field of Search ................. 192/106.2; 464/68, 64

[56] References Cited

U.S. PATENT DOCUMENTS

| | | | |
|---|---|---|---|
| 2,065,601 | 12/1936 | Meyer | 192/106.2 |
| 2,097,627 | 11/1937 | Lewis | 464/68 X |
| 2,745,268 | 5/1956 | Reed | 192/106.2 X |
| 3,101,600 | 8/1963 | Stromberg | 464/68 X |
| 3,414,101 | 12/1968 | Binder et al. | 464/68 X |
| 3,578,121 | 5/1971 | Maurice | 192/106.2 |
| 3,931,876 | 1/1976 | Beeskow et al. | 192/106.2 |
| 3,948,373 | 4/1976 | Worner | 192/106.2 |
| 4,024,938 | 5/1977 | Maucher | 192/106.2 |
| 4,036,341 | 7/1977 | Beeskow et al. | 192/106.2 |
| 4,212,380 | 7/1980 | Billet | 192/106.2 |
| 4,433,771 | 2/1984 | Caray | 192/106.2 |
| 4,440,283 | 4/1984 | Nioloux | 192/106.2 |
| 4,446,955 | 5/1984 | Lech | 464/68 X |
| 4,537,295 | 8/1985 | Fadler | 192/106.2 |
| 4,538,718 | 9/1985 | Maucher | 192/106.2 |
| 4,545,473 | 10/1985 | Alas | 192/106.2 |
| 4,548,310 | 10/1985 | Maucher | 192/106.2 |
| 4,549,641 | 10/1985 | Ootani et al. | 192/106.2 |

FOREIGN PATENT DOCUMENTS

7205198 9/1972 Fed. Rep. of Germany.
1680049 4/1973 Fed. Rep. of Germany.
2814240 10/1978 Fed. Rep. of Germany.

Primary Examiner—Rodney H. Bonck
Attorney, Agent, or Firm—Toren, McGeady & Associates

[57] ABSTRACT

The clutch disc for a friction disc clutch has a hub with external toothing engaging an internal toothing of a hub disc with predetermined rotational play. Axially on both sides of the hub disc, there are arranged side discs of an under-load vibration damper. Damper springs of an idling vibration damper are seated in windows of the hub disc radially inwardly of damper springs of the under-load vibration damper. The idling damper springs are coupled with the hub through side discs. The side discs are arranged axially on both sides of the hub disc and coupled non-rotatably with the external toothing of the hub. For the connection of the ends of the idling damper springs with the side discs, separate tabs formed on the side discs are provided. The components of an under-load friction damper can be arranged within or radially outwardly of the region defined by the under-load damper springs. Radially within the region of the under-load damper springs, at least one thrust ring is provided which transmits the force of an axially acting spring of the friction damper and/or centers the hub disc in relation to the side discs of the under-load vibration damper. The idling damper springs are seated in windows which are open to the windows of the under-load damper springs.

21 Claims, 10 Drawing Figures

CLUTCH DISC FOR A MOTOR VEHICLE FRICTION DISC CLUTCH

BACKGROUND OF THE INVENTION

The invention relates to a clutch disc for a motor vehicle friction disc clutch, and particularly a clutch disc with torsional vibration dampers for both an under-load range and an idling range.

From German Utility Model No. 7,205,198 a clutch disc for a motor vehicle friction disc clutch is known in which the hub for coupling with the gear input shaft carries a toothing by means of which a radially protruding hub disc is coupled non-rotatably, except for a pre-determined rotational play, with the hub. Side discs carrying the friction linings of the clutch disc are rotatably mounted on the hub axially on both sides of the hub disc. Damper springs which can be stressed in the relative rotation of the hub disc and the two side discs are arranged in windows of these discs. The damper springs together with the hub disc and the two side discs are parts of a torsional vibration damper for the under-load range of the clutch. A vibration damper for the idling range is arranged axially laterally of this under-load vibration damper. The idling vibration damper likewise comprises a hub disc seated non-rotatably on the hub and, axially on both sides of the hub disc, two side discs connected with one another and with the side disc unit of the under-load vibration damper.

In this clutch disc the input parts of the two vibration dampers, formed by the side discs, are firmly connected with one another. The idling vibration damper is stressed with the under-load vibration damper over the whole angle of relative rotation of the latter. Since only relatively little space is available for the installation of the damping springs of the idling vibration damper, the maximum angle of rotation is limited. Furthermore, the attunement of the spring characteristics of the idling vibration damper is problematical.

From German Pat. No. 1,680,049 a clutch disc is known in which the friction linings are held on a hub disc which is rotatable in relation to the hub. The hub disc is arranged axially between two side discs which in turn are secured to a hub sleeve. The hub sleeve encloses the actual hub of the clutch disc and is coupled non-rotatably but with play in the circumferential direction with the hub. The hub disc and the two side discs together with damper springs again are parts of a torsional vibration damper for the under-load range. Axially laterally of the under-load vibration damper, there is arranged a torsional vibration damper for the idling range, which likewise comprises a hub disc coupled non-rotatably with the hub, two side discs axially on both sides of this hub disc, and damper springs. The side discs of the idling vibration damper are firmly connected with the side discs of the under-load vibration damper. In this clutch disc the input parts of the idling vibration damper are coupled with the output parts of the under-load vibration damper. Thus, in fact the attunement of the idling vibration damper is facilitated, but the axial extent of the clutch disc is relatively great.

From Federal Republic of Germany Spec. No. 2,814,240 a clutch disc is known on the hub of which a hub disc is seated. The hub disc is connected with the hub through a toothing with rotational play, but otherwise non-rotatably. Axially on both sides of the hub disc there are arranged side discs which are connected with one another to form a unit which is rotatable in relation to the hub disc and carries the friction linings of the clutch disc. The hub disc and the side discs together with damper springs are parts of a vibration damper for the under-load range. Damper springs tuned to the idling range are seated in apertures of the toothing, radially between the hub and the hub disc. This clutch disc requires little space in the axial direction. However, it cannot be used when the important point is to transmit great torques through the clutch disc. The idling damper springs fitted in the region of the toothing weaken the toothing cross-section available for torque transmission. Thus, the number and size of the idling damper springs are limited.

Accordingly, the present invention is directed toward provision of a clutch disc for a motor vehicle friction disc clutch with torsional vibration dampers both for the under-load range and for the idling range. The clutch disc should be suitable for the transmission of relatively great torques and nevertheless have an axially space-saving construction. More particularly, the idling torsional damper is to be accommodated in protected manner and bridged over in the operation of the under-load torsional damper.

SUMMARY OF THE INVENTION

The clutch disc according to the invention comprises a hub provided with an external toothing and defining an axis of rotation, and an annular hub disc coaxially enclosing the hub and having on its internal circumference an internal toothing engaging in the external toothing of the hub. The external toothing of the hub protrudes beyond the hub disc axially on both sides and couples the hub nonrotatably but with pre-determined rotational play with the hub disc. On axially opposite sides of the hub disc, there are arranged two first side discs which are connected together with clutch friction linings into a construction unit which is mounted on the hub rotatably through a limited angle of rotation in relation to the hub disc. Several first damper springs are arranged, offset in angle in relation to one another around the axis of rotation, in apertures of the hub disc and of the first side discs. The first damper springs are stressable, in under-load operation of the clutch disc, in the relative rotation between the hub disc and the first side discs. Several second damping springs, dimensioned for idling operation, are arranged each in a window of the hub disc, offset in angle in relation to one another about the axis of rotation, radially within the region defined by the first damping springs. Furthermore, a second side disc is arranged rotatably in relation to the hub disc, axially between the hub disc and the first side disc, axially on each of the two sides of the hub disc, radially within the region defined by the first damping springs. Each of the two side discs carries on its internal circumference an internal toothing engaging in the external toothing of the hub. The second damper springs held in the windows of the hub disc are supported in the circumferential direction on the second side discs, so that they are resiliently stressable in the relative rotation between the hub disc and the second side discs.

In the clutch disc in accordance with the invention, the space defined by the under-load damper springs is optimally exploited without need to weaken the toothing coupling between the hub and the hub disc. The available space is particularly well utilized if the windows provided for the idling damper springs and the under-load damper springs in the hub disc merge radially into one another. Both the under-load torsional damper and the idling torsional damper are assembled symmetrically in relation to the disc, at least as regards their torsional damper components. Since the second side discs of the idling torsional damper engage together with the hub disc in the same external toothing of the hub, the clutch disc can be produced simply.

In preferred embodiments, the diameter of the second damper springs is made approximately equal to the thickness of the hub disc in the region of the windows which receive the damper springs. The coupling of the second side discs with the second damper springs can take place by means of plates which are guided axially fixedly, but displaceably in the circumferential direction of the hub disc, in the windows of the second damper springs. The plates lie loosely against the second side discs, so that in the case of torsional vibrations they can lift alternately away from the second side discs. Alternatively, tabs engaging axially in the windows of the second damper springs can be formed integrally on the second side discs. However, in this alternative each of the second side discs is coupled with the external toothing of the hub with a rotational play which is at least as great as the maximum rotational play between the hub disc and the hub.

At least the under-load torsional damper of the clutch disc comprises a friction damper which is arranged entirely, or only partially, within the region defined by the under-load damper springs. In a preferred embodiment, two thrust rings are arranged radially within the region outlined by the under-load damper springs. The thrust rings are seated axially on both sides of the hub disc in each case between the first and the second side disc, and enclose several axially acting helical compression springs between them which press the thrust rings against the first side discs. The helical compression springs are held in windows of the hub disc. The thrust rings are coupled non-rotatably through axially protruding tabs with the hub disc and fix the hub disc between them. In embodiments of the clutch disc in which the windows of the idling and under-load damper springs merge into one another, the tabs provided for the non-rotatable coupling of the thrust rings are utilized at the same time for the radial fixing of the idling damper springs. This measure is preferably also adopted in the case of other embodiments of the friction damper, particularly also when only one thrust ring is provided within the region enclosed by the under-load damper springs, or if in place of the helical compression springs other springs, or differently arranged axially acting springs, for example dished springs or corrugated springs, are used. More particularly, the tabs can also be used for the radial fixing of the above-mentioned helical compression springs.

The thrust rings of the under-load friction damper are preferably not only connected non-rotatably with the hub disc, but also supported axially on the hub disc. In embodiments where the axially acting springs are arranged axially between the thrust ring and one of the two first side discs, the axial force of the under-load friction damper is transmitted, independently of the idling damper, by way of the unit of the first side discs and by way of the hub disc, in a closed force path. The thrust ring, which is connected non-rotatably with the hub disc, is preferably arranged radially within the region defined by the under-load damper springs and overlaps the idling damper springs in the radial direction. The axially acting spring which generates the friction force and any friction rings present can be provided both within the region enclosed by the under-load damper springs or both outside this region. Advantageous embodiments, because axially flat, are achieved if the friction ring and the axially acting spring lie radially opposite to one another in relation to the under-load damper springs.

In a preferred embodiment, two identical thrust rings which enclose the axially acting spring, for example in the form of a dished spring, between them are arranged on the same axial side of the hub disc. The two thrust rings are coupled non-rotatably with the hub disc by axial tabs. If the tabs are used at the same time for the radial fixing of the idling damper springs in the windows of the hub disc, then the windows are arranged in two like groups in each of which the tabs of only one of the thrust rings engage. The thrust rings are installed, turned in relation to one another, in conformity with the angular offset of the window groups.

The various features of novelty which characterize the invention are pointed out with particularity in the claims annexed to an forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

The clutch disc according to FIGS. 1 to 4 comprises a hub 1 of sleeve form which is couplable through an internal toothing 3 non-rotatably but axially displaceably with a gear input shaft, which is rotatable about an axis 5 of rotation but is not further illustrated. The hub 1 carries an external toothing 7 which engages, with rotational play $\alpha$ in a first direction of rotation and rotational play $\gamma$ in the opposite direction of rotation, in an internal toothing 9 of a hub disc 11 of annular disc form protruding radially of the rotation axis 5, and couples the hub disc 11 non-rotatably but with said rotational play $\alpha\gamma$, with the hub 1. Axially on both sides of the hub disc 11, there are arranged cover plates or side discs 13, 15 which are firmly connected with one another through cross-pieces 17. The cross-pieces 17, which can be distance rivets, are formed in the present case as tabs formed integrally on the side disc 15 and welded with their ends to the side disc 13. The unit of the side discs 13, 15 is rotatably mounted on the hub 1 and fixed axially to axial end faces facing away from one another, for example of the external toothing 7. In the region of the external circumference of the side disc 15, a friction lining carrier 19 of annular disc form is secured with rivets 21. The friction lining carrier 19 carries clutch friction linings 23 on both sides radially outside the side discs 15, 13. The cross-pieces 17 pass through apertures 25 on the external circumference of the hub disc 11. The apertures 25 limit the maximum angle of rotation of the unit of the side discs 13, 15 in relation to the hub disc 11 and couple the side discs 13, 15 non-rotatably, after the take-up of this rotational play, with the hub disc 11.

Figure 1:
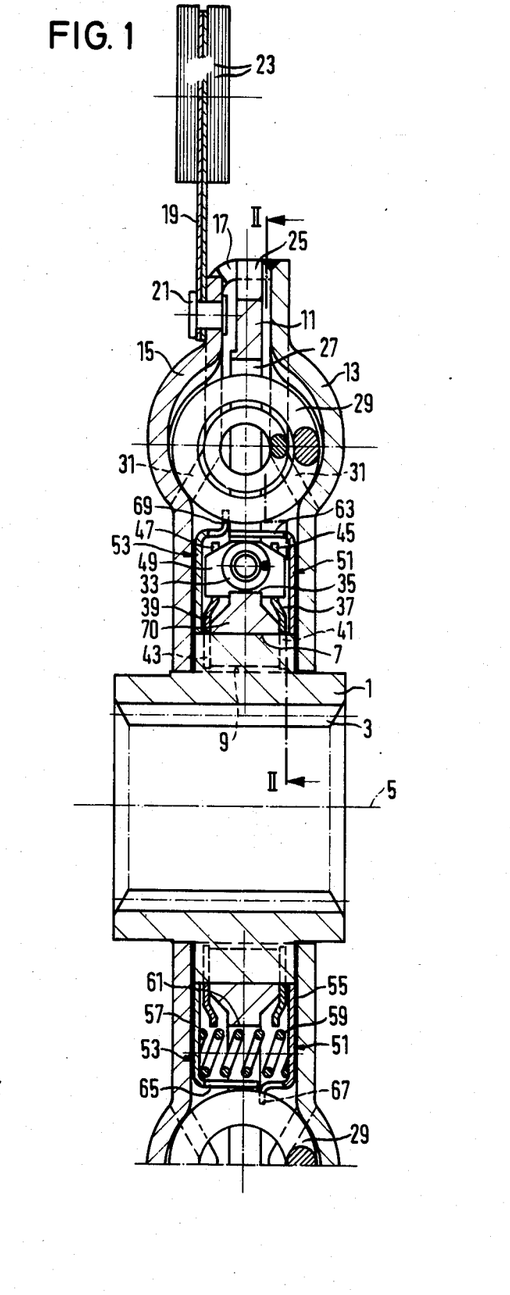
FIG. 1 shows a partial axial longitudinal section through a clutch disc for a motor vehicle friction disc clutch, seen along a line I—I in FIG. 2.
Figure 2:
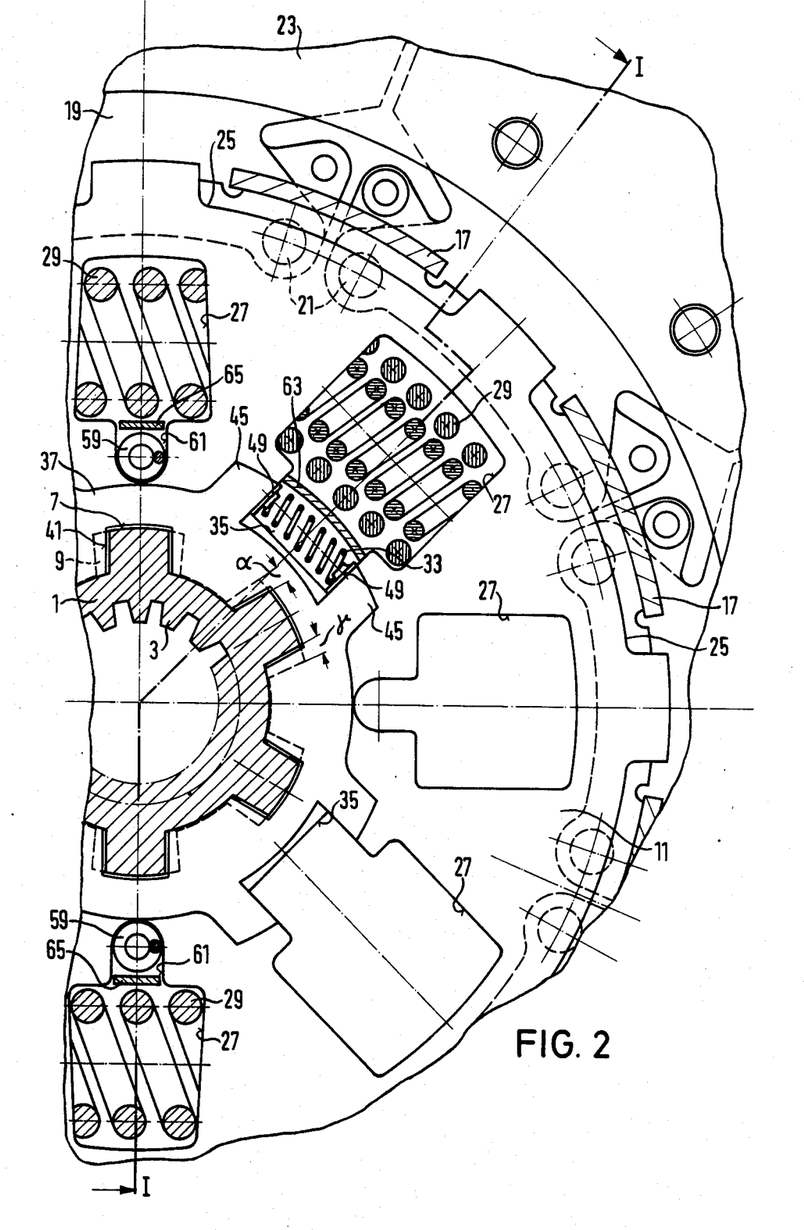
FIG. 2 shows a partial axial cross-section through the clutch disc, seen along a line II—II in FIG. 1.

The hub disc 11 contains several windows 27 distributed in the circumferential direction, each of which fixes a one-piece or multi-piece damper spring 29 in the circumferential direction. The damper springs 29 engage axially on both sides of the hub disc 11 in window-type apertures 31 of the two side discs 13, 15 and are resiliently stressed in the relative rotation between the side discs 13, 15 for the one part and the hub disc 11 for the other, in both directions of rotation. The hub disc 11, the side discs 13, 15 and the damper springs 29 form a torsional damper, dimensioned for operation under load, of the clutch disc.

The clutch disc further comprises a torsional damper dimensioned for idling operation, the components of which are arranged protected radially within or inwardly from the region enclosed by the damper springs 29, axially between the two side discs 13, 15. The idling torsional damper comprises several, here four, damper springs 33 arranged offset in relation to one another, which are guided in windows 35 of the hub disc 11 in the circumferential direction. The windows 35 overlap in the circumferential direction with the windows 27 and are formed by radially inwardly reaching widenings of the windows 27. Substantially annular-disc-shaped side discs 37, 39 are arranged radially within the region defined by the damper springs 29 on axially both sides of the hub disc 11 axially between the hub disc 11 and the two side discs 13, 15. On their internal circumference the side discs 37, 39 carry an internal toothing 41 and 43 respectively, engaging without rotational play in the external toothing 7 of the hub 1. For this purpose, the external toothing 7 protrudes axially on both sides beyond the hub disc 11. On the external circumference the side discs 37, 39 are provided, in the circumferential direction on both sides of the damper springs 33, with radially protruding noses 45 and 47 respectively, which each by pairs enclose the damper springs 33 between them. Seen in the circumferential direction, in each case plates 49 are inserted loosely between the two ends of the damper springs 33 and the adjacent noses 45, 47, so that in the relative rotation between the hub disc 11 for the one part and the two side discs 37, 39 for the other, they can lift alternately away from the hub disc 11 and the side discs 37, 39. The radially inwardly facing side of each plate 49 has an aperture or recess in which the window 35 engages with an edging extending substantially in the circumferential direction of the hub disc and guides the plate without play on the hub disc.

Figure 3:
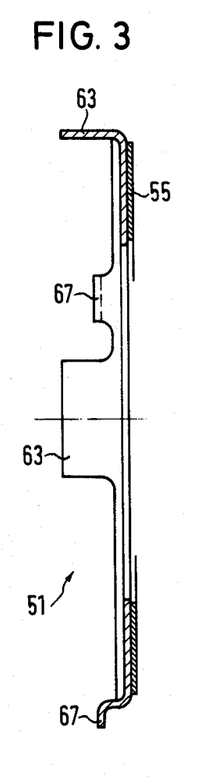
FIGS. 3 and 4 show axial longitudinal sections through two thrust rings used in the clutch disc according to FIGS. 1 and 2.
Figure 4:
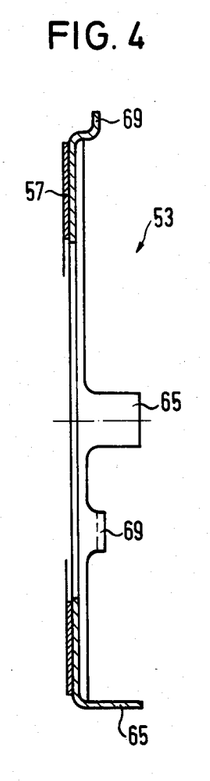

The clutch disc comprises a friction damper dimensioned for the under-load range, which is likewise accommodated radially within or unwardly from the region enclosed by the damper springs 29 between the two side discs 13, 15. The friction damper comprises thrust rings 51 and 53 substantially of disc form axially on both sides of the hub disc 11. The thrust rings 51, 53 are arranged each axially between the side discs 13 and 37 and between 15 and 39 and are rotatable in relation to the hub 1. On their surfaces facing the side discs 13, 15 they carry friction linings 55, 57. Axially between the two thrust rings 51, 53 there are arranged several axially acting helical compression springs 59 offset in the circumferential direction in relation to one another, which press the thrust rings 51, 53, through the friction linings 55, 57, against the side discs 13, 15. The helical compression springs 59 pass through windows 61 of the hub disc 11, which similarly to the windows 35 overlap with the windows 27 and are formed radially inwards as widenings of the windows 27. The damper springs 33 and the helical compression springs 59 alternate with one another in the circumferential direction. The thrust rings 51, 53 carry, on their external circumference, tabs 63 and 65 respectively, protruding axially towards one another, which in each case engage, radially between the damper springs 29 for the one part and the damper springs 33 and the helical compression springs 59, as the case may be, for the other part, in the windows 35 and 61 respectively. The tabs 63, 65 guide the thrust rings 51, 53 non-rotatably but axially displaceably on the hub disc 11 and at the same time fix the damper springs 33 and helical springs 59 radially in the windows 35 and 61 respectively. In the circumferential direction between the tabs 63 and 65, the thrust rings 51, 53 carry further axially protruding tabs 67 and 69 respectively, the ends of which are bent radially outwards. The tabs 67, 69 fix the hub disc 11, which is axially displaceable along the external toothing 7 of the hub 1, between themselves and thus in relation to the side discs 13, 15. Details of the thrust rings 51, 53 are represented in FIGS. 3 and 4.

In idling operation, the side discs 13, 15 and the hub disc 11 form a substantially torsionally rigid unit which can rotate in relation to the hub 1, against the action of the damper springs 33, in the range of the idling rotational play $\alpha\gamma$. In operation under load, after the rotational play $\alpha\gamma$ is taken up, the idling torsional damper is bridged over, and the under-load torsional damper and the under-load friction damper are exclusively effective.

The hub disc 11 carries on its internal circumference an annular foot 70, the axial thickness of which is greater than the thickness of the hub disc in the region of the windows 27, 35. The annular foot 70 is provided with the internal toothing 9 and increases the torque which can be transmitted by the clutch disc. The side discs 37, 39 are domed axially towards one another in the region of their external circumference and thus follow the contour of the annular foot 70.

Figure 5:
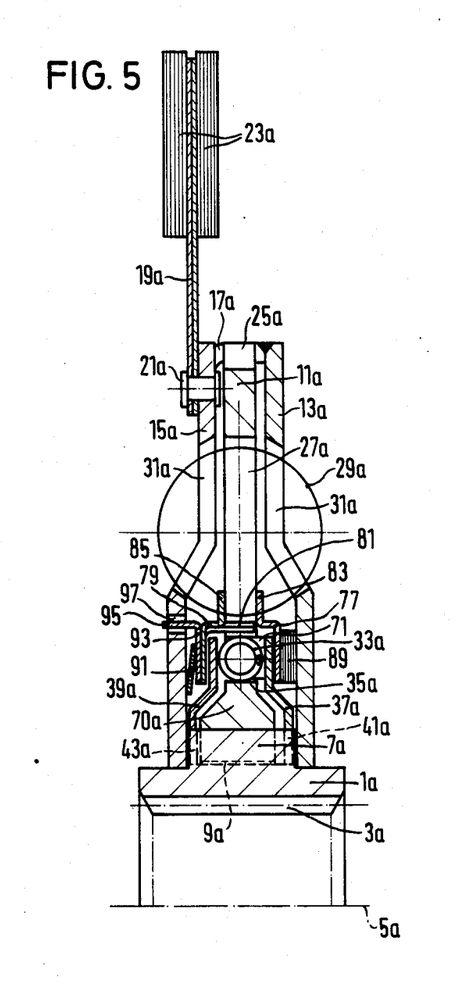
FIG. 5 shows an axial longitudinal section through one half of a second embodiment of a clutch disc for a motor vehicle friction clutch.
Figure 6:
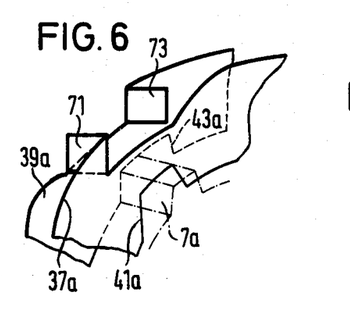
FIG. 6 shows a perspective detail view of two side discs utilized in the clutch disc according to FIG. 5.
Figure 7:
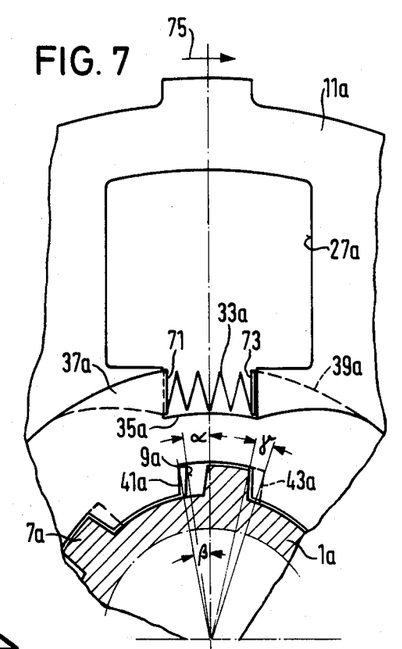
FIG. 7 shows a simplified partial axial cross-section through the clutch disc according to FIG. 5.

FIGS. 5 to 7 show another embodiment of a clutch disc for a motor vehicle friction clutch, which differs from the clutch disc according to FIGS. 1 to 4 essentially in the configuration of the side discs of the idling torsional damper and of the under-load friction damper. Parts of like action are designated in FIGS. 5 to 7 with the reference numerals of FIGS. 1 to 4, the letter a having been added for distinction. Individually, the parts 1 to 43 and 70 correspond to the parts 1a to 43a and 70a, reference being made to the description of FIGS. 1 to 4 for the explanation of these parts.

In place of the plate 49 of the clutch disc according to FIGS. 1 to 4, tabs 71 and 73 respectively, are formed on the side discs 37a and 39a of the idling torsional damper. The tabs 71, 73 of the two side discs 37a, 39a are bent away from the side discs 37a, 39a axially towards one another and engage by pairs in the window 35a of the hub disc 11a. Each of the damper springs 33a is braced in its windows 35a in the circumferential direction between the two tabs 71, 73. The internal toothings 41a, 43a of the side discs 37a, 39a engage with rotational play in the external toothing 7a of the hub 1a, so that the side discs 37a, 39a can be rotated in relation to one another against the force of the damper springs 33a. The rotational play, as shown by FIG. 7 for the side disc 37a, is larger by an angle $\beta$ than the idling rotational play $\alpha$ of the idling vibration damper. The same applies to the idling rotational play $\gamma$ (in the opposite direction of rotation). The tab 71 of the side disc 37a is so arranged, in relation to the internal toothing 41a of this side disc, that the damper spring 33a supported on the tab 71 applies the side disc 37a against the external toothing 7a with that flank of the internal toothing 41a which faces in the direction of the spring force exerted by the damper spring 33a upon the tab 71. If the hub disc 11a in idling operation is rotated in the direction of the arrow 75 entered in FIG. 7 in relation to the hub 1a, then the side disc 37a is likewise rotated in the direction of the arrow 75 by means of the tab 71 abutting on the side edge of the window 35a, until the idling rotational play $\alpha$ is taken up. Since the internal toothing 43a of the side disc 39a abuts in the direction of the arrow 75 on the external toothing 7a, the tab 73 lifts away from the side edge of the window 35a, and the damper spring 33a is resiliently loaded. Oppositely to the rotation direction 75, the idling rotational play $\gamma$ is utilized, and the tab 71 lifts away from the side edge of the window 35a. The angle $\beta$ compensates for tolerances of the clutch disc and may be very small.

The under-load friction damper comprises a thrust ring 77 and 79 axially on each of the two sides of the hub disc 11a, radially within the region defined by the damper springs 29a. The thrust rings 77, 79 are arranged axially between the side discs 13a and 37a and the side discs 15a and 39a, and radially overlap the region of the damper springs 33a. On their external circumferences, the thrust rings 77 and 79, similarly to the thrust rings 51 and 53 of FIGS. 3 and 4, carry tabs 81 which each engage radially between the damper springs 29a and 33a in the windows 35a of the damper springs 33a, and on the one hand fix the damper springs 33a radially in the windows and on the other hand guide the thrust rings 77, 79 non-rotatably but axially displaceably on the hub disc 11a. In this case each of the thrust rings 77, 79 carries tabs for every second one of the windows 35a.

The two thrust rings 77, 79 furthermore carry tabs 83 and 85 bent off axially towards one another between the tabs 81. The ends of the tabs 83, 85 are bent off radially outwards similarly to the tabs 67, 69 of the thrust rings 51, 53 and support the thrust rings 77, 79 on the hub disc 11a with axial spacing from the side discs 37a, 39a.

A friction lining 89 preferably secured to the thrust ring 77 is arranged axially between the thrust ring 77 and the axially adjacent side disc 13a. An axially acting spring 91, for example a dished or corrugated spring, is braced or secured in axially between the thrust ring 79 and the side disc 15a. A further thrust ring 93, which is guided with several axially bent-off tabs 95 in openings 97 of the side disc 15a non-rotatably but axially displaceably on the side disc 15a, is seated axially between the spring 91 and the thrust ring 79. The spring 91 is supported with its internal circumference on the side disc 15a and through the thrust rings 93, 79, the hub disc 11a and the thrust ring 77 stresses the friction lining 89 against the side disc 13a, which is connected into one unit with the side disc 15a. The thrust rings 77, 79 are preferably of identical configuration.

Figure 8:
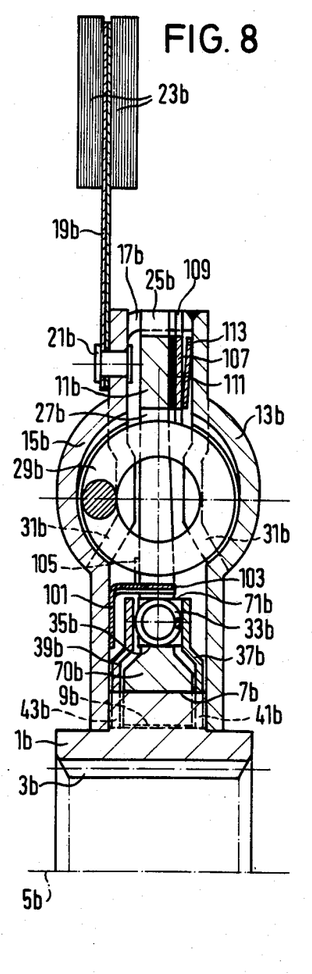
FIG. 8 shows an axial longitudinal section through the upper half of a third embodiment of a clutch disc for a motor vehicle friction disc clutch.

FIG. 8 shows a clutch disc which differs from the clutch disc according to FIGS. 5 to 7 essentially only in the configuration of the under-load friction damper. Parts of like action therefore are designated in FIG. 8 with the reference numerals of FIG. 5, the letter b being added in place of the letter a for distinction. For more detailed explanation therefore reference is made to the description of FIGS. 1 to 7.

The under-load friction damper comprises a thrust ring 101 radially within or inwardly of the region defined by the damper springs 29b of the under-load torsional damper. The thrust ring 101 corresponds substantially to the thrust ring 51 of the clutch disc of FIGS. 1 to 4, and is arranged between the side discs 15b and 39b in the region of the idling damper springs 33b. On its external circumference the thrust ring 101 carries axially extending bent-off tabs 103 which engage radially between the damper springs 29b and 33b in the windows 35b of the damper springs 33b and on the one hand fix the damper springs 33b radially in the windows 35b and on the other hand guide the thrust ring 101 non-rotatably but axially displaceably on the hub disc 11b. The thrust ring 101 is supported either directly or through a friction member or ring (not shown further) on the side disc 15b. Between the tabs 103 the thrust ring 101 carries bent-off tabs 105, similar to the tabs 67 of the thrust ring 51, with the hub disc 11b resting on their radially protruding ends.

Radially outside the region defined by the under-load damper springs 29b a further thrust ring 107 is arranged axially between the hub disc 11b and the side disc 13b. The thrust ring 107 has on its external circumference apertures 109 through which the cross-pieces 17b pass and connect the thrust ring 107 non-rotatably but axially displaceably with the unit of the side discs 13b, 15b. Axially between the thrust ring 107 and the hub disc 11b a friction member 111 is arranged, and axially between the thrust ring 107 and the side disc 13b there is braced or secured an axially acting spring 113, for example a dished or corrugated spring. The spring 113 presses the thrust ring 107 against the friction ring member or 111, which is preferably secured on the hub disc 11b. The force path of the spring 113 is closed by way of the side disc 13b, the cross-pieces 17b, the side disc 15b and the thrust ring 101 to the hub disc 11b. Similarly to the clutch disc according to FIGS. 5 to 7, in the clutch disc according to FIG. 8, the hub disc is again centered axially, by means of the under-load friction damper and its thrust rings, on the side discs of the under-load torsional damper.

Figure 9:
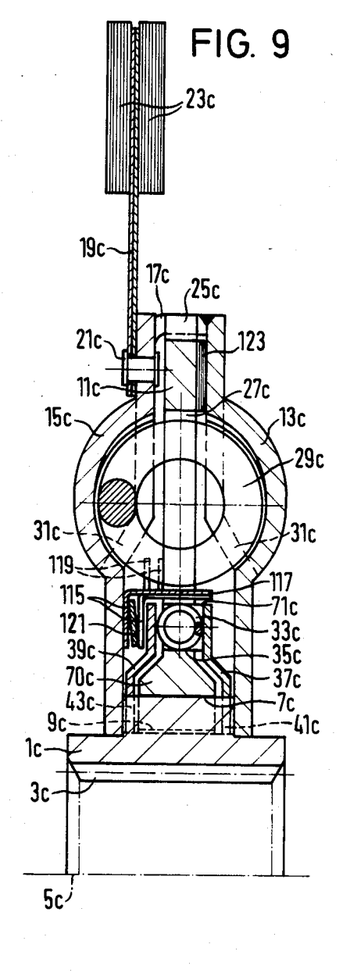
FIG. 9 shows an axial longitudinal section through one half of a fourth embodiment of a clutch disc for a motor vehicle friction disc clutch.

FIG. 9 shows a further variant of the clutch disc according to FIGS. 5 to 7, which again differs only in its under-load friction damper. Parts of like effect are designated in FIGS. 9 and 10 with the reference numerals of FIGS. 5 to 7, the letter a being replaced by the letter c for distinction. More particularly, the parts 1a to 43a, 70a and 1c to 43c and 70c correspond to one another. For explanation reference is made to the description of FIGS. 1 to 7.

Figure 10:
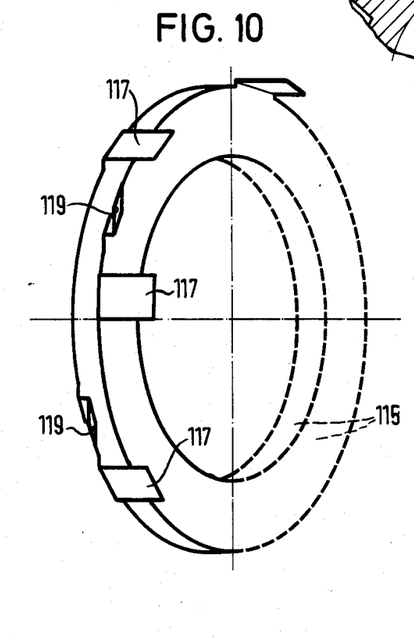
FIG. 10 shows a perspective representation of two thrust rings used in the clutch disc according to FIG. 9.

The under-load friction damper of the clutch disc comprises two identical thrust rings 115 arranged side by side between the hub disc 11c and the side disc 15c. The thrust rings are arranged radially within the region defined by the under-load damper springs 29c and radially overlap the region of the idling damper springs 33c. The thrust rings 115 substantially correspond to the thrust ring 53. As best shown by FIG. 10, tabs 117 protrude axially from the external circumference of each of the thrust rings, each of which tabs engages in one of the windows 35c of the idling damper springs 33c. The tabs 117 radially fix the idling damper springs 33c in their windows 35c and guide the thrust rings 115 non-rotatably but axially displaceably on the hub disc 11c. The windows 35c are arranged in two like groups, the groups being offset in angle in relation to one another. Each of the thrust rings 115 has tabs 117 for one of the two groups and is installed offset in angle in relation to the other thrust ring 115, according to the group allocated to it.

Like the tabs 67 of the thrust ring 51 (FIG. 1), the thrust rings 115 also have tabs 119 protruding axially of the hub disc 11c the end of which tabs are bent off radially outwards. The tabs 119 of the thrust ring 115 adjacent to the side disc 39c are supported on the hub disc 11c. The thrust ring 115 axially adjacent to the side disc 15c lies on the side disc 15c directly or through a friction member or ring (not shown further). An axially acting spring 121, for example a dished or corrugated spring, is seated between the thrust rings 115. Radially outwardly the region defined by the damper springs 29c, a friction member or ring 123, preferably secured to the hub disc 11c, is arranged between the hub disc 11c and the side disc 13c. The force path of the spring 121, which is supported on the side disc 15c through the axially outer thrust ring 115, is closed by way of the other thrust ring 115, the hub disc 11c, the friction ring 123, the side disc 13c and the cross-pieces 17c.

In the clutch disc according to FIG. 9, the components of the under-load friction damper are distributed among the regions radially within or inwardly from the damper springs 29c. Thus, a particularly narrow construction style radially outside the damper springs 29c is achieved. Since the friction member or ring 123 is arranged on a relatively large mean diameter, great friction torques can be generated, and by reason of the large friction area the wear is very slight.

In all the clutch discs as explained above the annular foot of the hub disc carrying the internal toothing is wider in the axial direction than is the hub disc itself. Thus, a relatively great torque can be transmitted through the toothing to the hub. A large number of idling damping springs can be used. Since the diameter of the idling damping springs is at most slightly thicker than the hub disc, the side discs coupled with the idling damper springs can be domed by deep-drawing in the axial direction in conformity with the contour of the annular foot, which increases their rigidity of form.

While specific embodiments of the invention have been shown and described in detail to illustrate the application of the inventive principles, it will be understood that the invention may be embodied otherwise without departing from such principles.

We claim:

1. A clutch disc for a motor vehicle friction disc clutch, comprising a hub defining a rotation axis and provided with an external toothing, an annular hub disc co-axially enclosing the hub and comprising on its internal circumference an internal toothing engaging in the external toothing of the hub and coupling the hub disc non-rotatably but with predetermined rotational play with the hub, said external toothing of the hub protruding axially on both sides beyond the hub disc, two first side discs arranged on axially opposite sides of the hub disc, said first side discs being connected into a unit mounted on the hub rotatable over a limited angle of rotation in relation to the hub disc, several first damper springs arranged offset in angle about the rotation axis in relation to one another in first windows of the hub disc and of the first side discs, and stressable in under-load operation in the relative rotation between the hub disc and the first side discs, two second side discs arranged on axially opposite sides of the hub disc, radially inwardly of the region defined by the first damper springs, each of said second side discs being arranged axially between the hub disc and one of the first side discs, rotatably in relation to the hub disc, and each of said two second side discs comprising on its internal circumference an internal toothing engaging in the external toothing of the hub, several second damper springs dimensioned for idling operation and arranged radially inwardly of the region defined by the first damper springs, offset in angle in relation to one another about the rotation axis, each of said second damper springs being held in a different second window of the hub disc being supported in a circumferential direction on the second side discs, whereby said second damper springs are resiliently stressable in the relative rotation between the hub disc and the second side discs, clutch friction linings connected with the unit of the first side discs, the diameter of said second damper springs is approximately equal to the thickness of the hub disc in the region of the second windows which accommodate the second damper springs, wherein the second side discs have apertures lying axially opposite to the windows of the hub discs in which the second damper springs are arranged, and wherein in the second windows of the hub disc, on both sides, in the circumferential direction of the hub disc of each damper spring, plates are guided displaceably in the circumferential direction and engage movably in the apertures of the two second side discs, and each plate has on its radially inwardly facing side an aperture in which the window engages with an edging extending substantially in the circumferential direction of the hub disc and guides the plate axially without play in the hub disc.

2. The clutch disc according to claim 1, wherein the hub disc comprises, radially within the region defined by the second damper springs, an axially thickened annular foot carrying the internal toothing and wherein the two second side discs are domed axially outwards away from one another in the region of their internal circumference.

3. The clutch disc according to claim 1, wherein the second windows of the second damper springs, seen in the circumferential direction, overlap with the first windows of the first damper springs and merge in radially opened manner into these windows.

4. The clutch disc according to claim 3, wherein at least axially on one side of the hub disc, radially within the region defined by the first damper springs, a thrust ring of a friction damper dimensioned for operation under load is arranged axially between the first side disc and the second side disc, said thrust ring carrying axially protruding tabs which engage radially between the first damper spring and the second damper spring in the window of the second damper spring and fixes the latter radially in its window.

5. A clutch disc for a motor vehicle friction disc clutch, comprising a hub defining a rotation axis and provided with an external toothing, an annular hub disc co-axially enclosing the hub and comprising on its internal circumference an internal toothing engaging in the external toothing of the hub and coupling the hub disc non-rotatably but with predetermined rotational play with the hub, said external toothing of the hub protruding axially on both sides beyond the hub disc, two first side discs arranged on axially opposite sides of the hub disc, said first side discs being connected into a unit mounted on the hub rotatably over a limited angle of rotation in relation to the hub disc, several first damper springs arranged offset in angle about the rotation axis in relation to one another in first windows of the hub disc and of the first side discs, and stressable in underload operation in the relative rotation between the hub disc and the first side discs, two second side discs arranged on axially opposite sides of the hub disc, radially inwardly of the region defined by the first damper springs, each of said second side discs being arranged axially between the hub disc and one of the first side discs, rotatable in relation to the hub disc, and each of said two second side disc comprising on its internal circumference an internal toothing engaging in the external toothing of the hub, several second damper springs dimensioned for idling operation and arranged, radially inwardly of the region defined by the first damper springs, offset in angle in relation to one another about the rotation axis, each of said second damper springs being held in a different second window of the hub disc and being supported in the circumferential direction on the second side discs, whereby said second damper springs are resiliently stressable in the relative rotation between the hub disc and the second side discs, clutch friction linings connected with the unit of the first side discs, the diameter of the second damper springs is approximately equal to the thickness of the hub disc in the region of the windows which accommodate the damper springs, wherein tabs protrude by pairs axially towards one another from the two second side discs and enclose the second damper springs between them in the windows of the hub discs, and wherein the internal toothing of each of the two second side discs engages in the external toothings of the hub with rotational play which is at least as great as said rotational play provided by the internal toothing of the hub disc.

6. The clutch disc according to claim 5, wherein for the formation of a friction damper effective in operation under load, axially on at least one side of the hub disc, a thrust ring is arranged axially between one of the first side discs and the adjacent second side disc in the region of the second damper springs, said thrust ring comprising at least one axially protruding extension by means of which it is supported on the hub disc, and wherein an axially acting spring is secured axially between the thrust ring and the first side disc axially adjacent to the thrust ring.

7. The clutch disc according to claim 6, wherein a friction ring is arranged axially between the hub disc and the first side disc, on the side of the hub disc axially remote from the thrust ring spaced radially from the region defined by the first damper springs.

8. The clutch disc according to claim 7, wherein the axially acting spring is arranged, on the side of the hub disc acially remote from the friction ring, axially between the thrust ring and the first side disc, radially within the region defined by the first damper springs.

9. The clutch disc according to claim 8, wherein the second damper springs are arranged in two groups of second windows of the hub disc which are equally distributed but offset in angle in relation to one another about the axis of rotation, wherein on the same side of the hub disc, two identical thrust rings with tabs protruding to the hub disc are arranged axially between the first side disc and the second side disc, wherein the thrust rings are offset in angle in relation to one another about the rotation axis and are axially movably guided by means of their tabs each engaging in one of the second windows of of the two groups, and wherein the axially acting spring is arranged axially between two thrust rings.

10. The clutch disc according to claim 6, wherein axially on both sides of the hub disc, radially within the region defined by the first damper springs, thrust rings guided non-rotatably on the hub disc are axially arranged each between a different one of the first side discs and the adjacent one of the second side discs, said two thrust rings being supported through axially protruding extensions on the hub disc, wherein the axial acting spring is secured axially between one of the thrust rings and the first side disc adjacent to it, radially within the region defined by the first damper springs.

11. The clutch disc according to claim 10, wherein a friction ring is arranged axially between the other of said two thrust rings and said other first side disc.

12. The clutch disc according to claim 10, wherein a further thrust ring guided non-rotatably but axially movably on the first side disc is arranged axially between the axially acting spring and the thrust ring.

13. The clutch disc according to claim 5, wherein for the formation of a friction damper effective in operation under load, axially on at least one side of the hub disc, a thrust ring is arranged axially between one of the first side discs and the adjacent second side discs in the region of the second damper springs, said thrust ring comprising at least one axially protruding extension by means of which it is supported on the hub disc, and wherein an axially acting spring is secured axially between the hub disc and the one of the first side discs situated axially remote from the thrust ring.

14. The clutch disc according to claim 13, wherein the axially acting spring is arranged radially outwardly of the region defined by the first damper springs, axially between a friction ring and the adjacent first side disc, and wherein another thrust ring guided non-rotatably but axially displaceably on the unit of the first side discs is arranged axially between the friction ring and the axially acting spring.

15. A clutch disc for a motor vehicle friction disc clutch, comprising a hub defining a rotation axis and provided with an external toothing, an annular hub disc co-axially enclosing the hub and comprising on its internal circumference an internal toothing engaging in the external toothing of the hub coupling the hub disc non-rotatably but with pre-determined rotational play with the hub, said external toothing of the hub protruding axially on both sides beyond the hub disc, two first side discs arranged on axially opposite sides of the hub disc, said first side discs being connected into a unit mounted on the hub rotatably over a limited angle of rotation in relation to the hub disc, several first damper springs arranged offset in angle about the rotation axis in relation to one another in first windows of the hub disc and of the first side discs, and stressable in under load operation in the relative rotation between the hub disc and the first side discs, two second side discs arranged on axially opposite sides of the hub disc radially inwardly of the region defined by the first damper spring, each of said second side discs being arranged axially between the hub disc and one of the first side discs, rotatably in relation to the hub disc, and each of said two second side discs comprising on its internal circumference an internal toothing engaging in the external toothing of the hub, several second damper springs dimensioned for idling operation and arranged, radially inwardly of the region defined by the first damper springs, offset in angle in relation to one another about the rotation axis, each of said second damper springs being held in different first ones of second windows of the hub discs and being supported in the circumferential direction on the second side discs, whereby said second damper springs are resiliently stressable in the relative rotation between the hub disc and the second side discs, clutch friction linings connected with the unit of the first side discs, for the formation of friction damper which is effective in operation under load, axially on each of the two sides of the hub disc, radially within the region radially defined by the first damper springs, there is arranged a thrust ring connected non-rotatably but axially movable with the hub disc, axially between one of the first side discs and the adjacent second side disc, and wherein in second ones of the second windows of the hub disc there are seated axially acting helical compression springs which are secured in the axially acting direction thereof between the two thrust rings and press these against the first side discs.

16. The clutch disc according to claim 15, wherein the thrust rings carry tabs protruding axially of the hub disc, which tabs axially fix the hub disc between the thrust rings.

17. The clutch disc according to claim 15, wherein the second windows of the axially acting helical compression springs and the second windows of the second damper springs are arranged substantially on one common circle.

18. The clutch disc according to claim 15, wherein the second ones of the second windows containing the axially acting helical compression springs, seen in the circumferential direction, overlap with the first windows of the first damper springs and merge in radially opened manner into these first windows.

19. The clutch disc according to claim 18, wherein at least one of the thrust rings carries axially protruding tabs which engage radially between the first damper spring and the helical compression spring in the second window of the helical compresssion spring and fix the latter radially in its second window.

20. The clutch disc according to claim 15, wherein the second windows of the axially acting helical compression springs and of the second damper springs alternate with one another in the circumferential direction of the hub disc.

21. The clutch disc according to claim 15, wherein the thrust rings carry friction linings on their surfaces axially facing the first side discs.

* * * * *